United States Patent
Zhang et al.

(10) Patent No.: US 12,361,185 B1
(45) Date of Patent: Jul. 15, 2025

(54) SEMI-PHYSICAL SIMULATION VERIFICATION METHOD FOR CONTROL STRATEGY OF DISTRIBUTED HYBRID POWER SYSTEM

(71) Applicant: Beijing Institute of Technology, Beijing (CN)

(72) Inventors: Zhenyu Zhang, Beijing (CN); Mingda Fei, Beijing (CN); Binzuilin Wu, Beijing (CN); Wenbo Zhao, Beijing (CN); Zhengfu Xia, Beijing (CN); Hongyu Chen, Beijing (CN); Yi Zhong, Beijing (CN)

(73) Assignee: Beijing Institute of Technology, Beijing (CN)

( * ) Notice: Subject to any disclaimer, the term of this patent is extended or adjusted under 35 U.S.C. 154(b) by 0 days.

(21) Appl. No.: 19/031,317

(22) Filed: Jan. 17, 2025

(30) Foreign Application Priority Data

Mar. 18, 2024 (CN) .......................... 202410302722.6

(51) Int. Cl.
*G06F 30/12* (2020.01)

(52) U.S. Cl.
CPC .................................. *G06F 30/12* (2020.01)

(58) Field of Classification Search
CPC ....................................................... G06F 30/12
See application file for complete search history.

(56) References Cited

U.S. PATENT DOCUMENTS

| | | | | |
|---|---|---|---|---|
| 2018/0329394 | A1* | 11/2018 | Manabe | G05B 19/4099 |
| 2021/0294944 | A1* | 9/2021 | Nassar | G05D 1/0088 |
| 2023/0090083 | A1* | 3/2023 | Maloney | F02D 41/2422 |
| | | | | 123/436 |

OTHER PUBLICATIONS

Nemes, Raul Octavian, et al. "X-in-the-loop-based high accuracy test facility for industrial development of electric vehicles." IEEE Transactions on Transportation Electrification 9.2 (2022): 2778-2791. (Year: 2022).*

Pintilie, Lucian-Nicolae, et al. "FPGA based Real-Time simulation of FlyBack converter using graphical programming tools." 2023 10th International Conference on Modern Power Systems (MPS). IEEE, 2023. (Year: 2023).*

Chuanxue, Song, Xiao Feng, and Peng Silun. "Implementation of electric vehicle hardware-in-the-loop test platform." Int. J. Multimedia Ubiquitous Eng 10.11 (2016): 147-158. (Year: 2016).*

"Development of Real-time Simulation Platform for Hybrid Vehicle Controller", Liu Peng et al.Internal Combustion Engine and PowerDevices, vol. 35, No. 1, pp. 29-34; Feb. 15, 2018.

* cited by examiner

*Primary Examiner* — Nithya J. Moll

(57) ABSTRACT

The present disclosure provides a semi-physical simulation verification method for a control strategy of a distributed hybrid power system, including the following steps: designing a rapid prototyping controller; completing a connection between a semi-physical simulation test platform and an upper computer; building a distributed hybrid power system simulation model using MATLAB/Simulink; and forming a code in Simulink and generating a MATLAB Function module, setting a signal output module for a control signal output under a control strategy, and establishing a corresponding relationship between the signal output module and an output signal interface of the rapid prototyping controller. According to the present disclosure, the test cost generated during verifying the feasibility of the control strategy of the distributed hybrid system is effectively reduced.

3 Claims, 2 Drawing Sheets

SEMI-PHYSICAL SIMULATION VERIFICATION METHOD FOR CONTROL STRATEGY OF DISTRIBUTED HYBRID POWER SYSTEM

CROSS-REFERENCE TO RELATED APPLICATION

This application claims priority of Chinese Patent Application No. 202410302722.6, filed on Mar. 18, 2024, the entire contents of which are incorporated herein by reference.

TECHNICAL FIELD

The present disclosure is in the field of hardware-in-the-loop simulation test, and particularly relates to a semi-physical simulation verification method for a control strategy of a distributed hybrid power system.

BACKGROUND

The distributed hybrid power system is undergoing a rapid rising trend and developing momentum. There are mainly two methods to verify the parameter matching solution for distributed hybrid power systems of different combinations and the real-time effectiveness of the control strategy of the distributed hybrid power system. One is the control strategy verification of the distributed hybrid power system based on the experimental bench built by the parameter matching solution, which can obtain the most realistic situation of the control strategy of the distributed hybrid power system. However, the cost is high, and the normal operation of the experimental bench is affected if the control strategy of distributed hybrid power system goes wrong. The other method is semi-physical test platform verification based on hardware-in-the-loop simulation system. However, most of the hardware-in-the-loop simulation is configured with signal output interfaces set up according to the running characteristics of the traditional engine, which cannot completely and clearly display the running characteristics of the distributed hybrid system, thereby failing to verify the effectiveness and real-time performance of the control strategy of the distributed hybrid system.

Therefore, a feasible method is needed to control the cost based on the complete and clear feasibility verification of the control strategy of distributed hybrid power system.

SUMMARY

In response to the above problem, an objective of the present disclosure is to provide a semi-physical simulation verification method for a control strategy of a distributed hybrid power system, which can effectively reduce the test cost generated during verifying feasibility of the control strategy of the distributed hybrid power system.

To achieve the above objective, the present disclosure provides the following technical solutions.

A semi-physical simulation verification method for a control strategy of a distributed hybrid power system provided by the present disclosure includes the following steps:

designing and obtaining a rapid prototyping controller based on a distributed hybrid power system and a control strategy of the distributed hybrid power system in advance;

inputting communication addresses of a hardware-in-the-loop simulation system and the rapid prototyping controller into connection software of a real-time simulator of an upper computer respectively, and completing a connection work between a hardware-in-the-loop simulation test platform and the upper computer;

building a simulation model of the distributed hybrid power system using MATLAB/Simulink based on an architecture of the distributed hybrid power system;

forming a code in Simulink and generating a MATLAB Function module based on the control strategy of the distributed hybrid power system, setting a signal output module for a control signal output by the control strategy of the distributed hybrid power system, and establishing a corresponding relationship between same and an output signal interface of the rapid prototyping controller;

using a code conversion module of Simulink to convert a simulation model file of the distributed hybrid power system into a dll file and download same to a real-time simulator of the hardware-in-the-loop simulation system, and to convert a model file of the control strategy of the distributed hybrid power system into a so file and download same to a real-time simulator of the rapid prototyping controller;

detecting a download condition of a model and a signal feedback connection condition between the semi-physical simulation platform and the upper computer by upper computer software; and running the hardware-in-the-loop simulation platform by the upper computer software, and verifying the feasibility and real-time performance of the control strategy of the distributed hybrid power system by a dynamic characteristic data curve transmitted by the hardware-in-the-loop simulation system in a visualization platform.

Preferably, the designing and obtaining a rapid prototyping controller based on a distributed hybrid power system and a control strategy of the distributed hybrid power system in advance includes the following steps:

designing and obtaining a real-time simulator board card capable of outputting dynamic characteristic signals based on a signal output rule in a design solution of the distributed hybrid power system;

embedding the real-time simulation board card into a PXIe-1085 chassis and matching same with a PXIe-1088 processor, and outputting a corresponding signal via a corresponding pin, and building a signal conditioning module according to the number of output signal paths of the distributed hybrid power system;

obtaining a simulator after being equipped with a fault injection module and a break-out box (BOB) module, the fault injection module being used for simulating an electronic control unit (ECU) pin for open-circuit, power short-circuit and ground short-circuit fault; and constructing the rapid prototyping controller based on the control strategy of the distributed hybrid power system by the simulator.

Preferably, the real-time simulator board card includes:

an analog input card, with 32-channel for analog input, a 2M/s sampling rate, 4-channel for analog outputs, 48-channel bidirectional digital input/output (IO) and 2-channel 32-bit counter;

an analog output card, with 32-channel for analog output, 10-channel digital quantity and 4-channel 32-bit counter; and a power system simulation card, which supports time sequence signal simulation and fuel injection signal acquisition of a free piston engine, comprising at least 16 solenoid valve detections, detection values comprising a solenoid valve opening piston position, a solenoid valve closing piston position and a start time.

Preferably, the visualization platform is communicatively connected to the hardware-in-the-loop simulation system, and a communication interface test is performed via the upper computer software to ensure that an output signal port of the hardware-in-the-loop simulation system corresponds to a signal port of the visualization platform one by one, and performs signal receiving work.

The visualization platform includes two major parts, namely, a two-dimensional configuration module and a three-dimensional functional module; the visualization platform further includes a visual user interface (UI), a terrain selection, a day-night selection, a weather system configuration, a two-dimensional flow chart and graph, a three-dimensional model data module, a three-dimensional energy flow relationship and a three-dimensional visual functional module; and multiple parts are connected under the same network and communicate via a unified network protocol.

The present disclosure has at least the following advantageous effects.

1. According to the running characteristics of the distributed hybrid power system and the output form of main parameters, a set of test platform connecting the rapid prototyping controller and the hardware-in-the-loop simulation system is designed, in which two parts include self-developed board cards to ensure the accuracy and clarity of the control signal and power system output signal, and the error of control signal or excessive computation will not cause damage to the model-based test platform, effectively reducing the test cost.

2. A test method to verify the control strategy of the distributed hybrid power system is provided, which is process-oriented and operable, and can verify the effectiveness and real-time performance of the control strategy of the distributed hybrid power system according to the output signals of the running characteristic parameters of the power system.

3. A data visualization method coupled with the test platform is provided, and the real-time output data of the hardware-in-the-loop simulation system can be displayed in three-dimensional way through the visualization platform, thereby better reflecting the impact of the power system energy output on the whole vehicle and performing the power system research work.

Additional advantages, objectives and features of the present disclosure will be set forth hereinafter and will be obvious to a certain extent to those skilled in the art or may be learned by those skilled in the art in practice. The objectives and other advantages of the present disclosure will be realized and obtained by the following specification.

BRIEF DESCRIPTION OF THE DRAWINGS

For clearer objectives, technical solutions and advantageous effects of the present disclosure, the present disclosure provides the following accompanying drawings for description.

DETAILED DESCRIPTION

Figure 1:
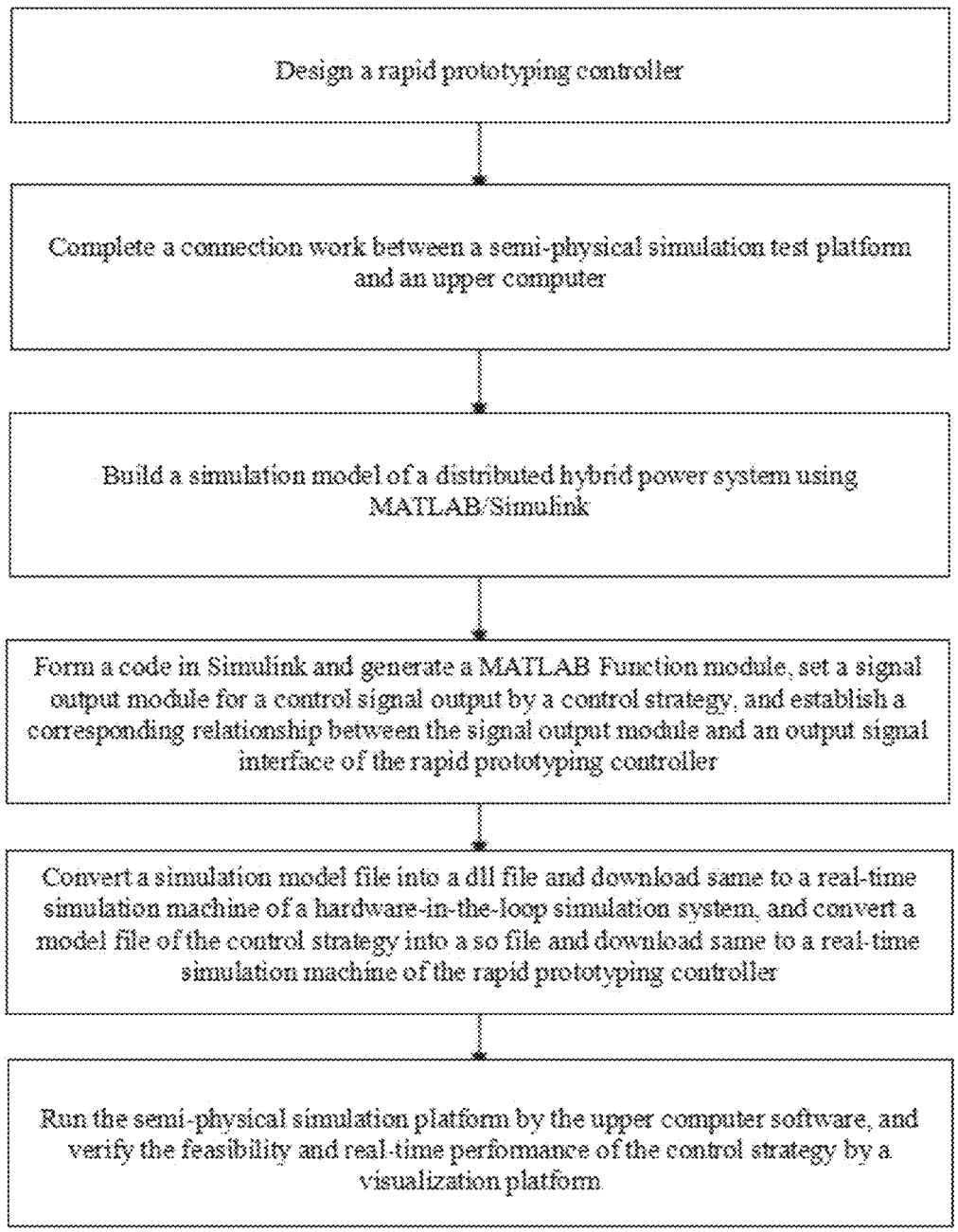
FIG. 1 is a flowchart showing steps of a semi-physical simulation verification method for a control strategy of a distributed hybrid power system according to an example of the present disclosure.
Figure 2:
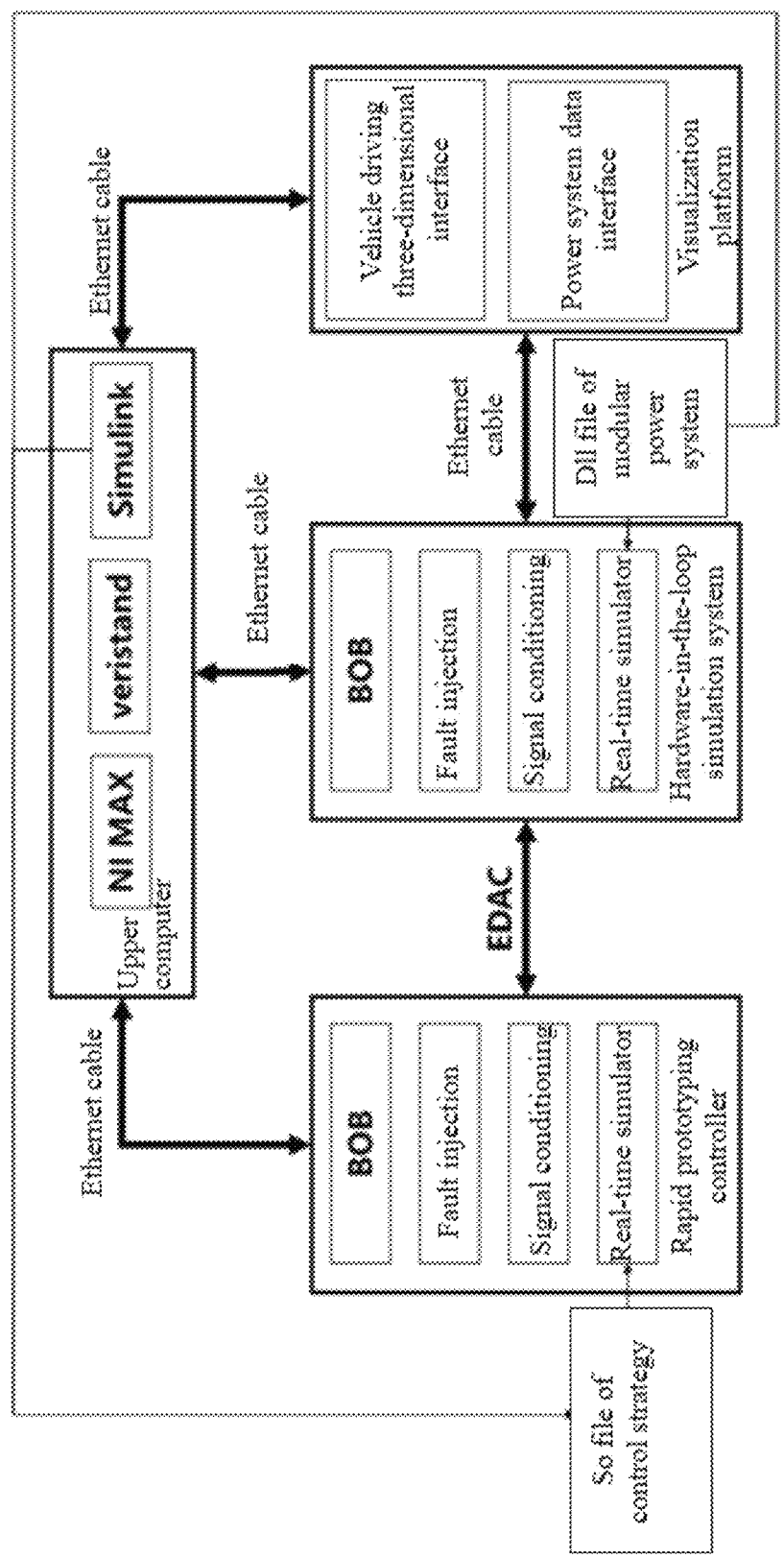
FIG. 2 is a schematic structural diagram of a distributed hybrid power system according to the example of the present disclosure.

While the preferred examples of the present disclosure will be described below with reference to the accompanying drawings, and it is to be understood that the preferred examples described herein are illustrative and explanatory only and are not restrictive.

A semi-physical simulation verification method for a control strategy of a distributed hybrid power system provided by the present disclosure includes a distributed hybrid power system.

The distributed hybrid power system includes a motor, an engine, a battery pack, a supercapacitor and a power distribution system. The motor and the engine are power source for driving a vehicle; the battery pack and the supercapacitor are responsible for storing energy; and the power distribution system can realize the optimal control of the system by controlling power output ratios of the motor and the engine. The distributed hybrid power system is a new type of hybrid power system. Compared with traditional hybrid power system, it has more advantages and features, in which, the most notable features include the flexibility of system structure, the improvement of system efficiency, the enhancement of energy recovery capacity and the friendliness to the environment. A power module includes a plurality of power units, and an energy management system of the power module controls the energy output of each power unit via a MAP according to the distributed power and feeds back the operation information about the power units to a power flow control system in real time.

An energy storage unit includes a storage battery and a supercapacitor. An energy management system possessed by the energy storage unit is divided into a battery energy management system and a capacitor energy management system, and the two control the energy output or energy recovery of the battery and the capacitor according to the distributed power. At the same time, the two feed back the running characteristics of the battery and the capacitor and the health status of the battery to the power flow control system. The rapid charging and rapid discharging characteristics of the supercapacitor can realize the supply of high-frequency power, and improve the power responsiveness of the power system and balance the power demand of the power system, thereby realizing partial protection for other power modules.

The motor completes electric energy conversion and energy output, and an energy management system thereof controls the motor to convert electric energy transmitted from the power module and the energy storage unit into mechanical energy and output same.

Before the control strategy of distributed hybrid power system is verified, a real-time simulator board card is obtained based on a signal output rule in a design solution of the distributed hybrid power system, including an analog input card (32-channel for analog input, 2 M/s sampling rate; 4-channel for analog output; 48-channel bidirectional digital IO; and 2-channel 32-bit counter), an analog output card (32-channel for analog output, 10-channel digital quantity, and 4-channel 32-bit counter) and a power system simulation card (the module supports time sequence signal simulation and fuel injection signal acquisition of a free piston engine; and each module includes at least 16 solenoid valve detections, detection values include a solenoid valve opening piston position, a solenoid valve closing piston position and a start time). A real-time simulation board card is embedded into a PXIe-1085 chassis and matched with a PXIe-1088 processor, and a corresponding signal is output via a corresponding pin, and a signal conditioning module (including a digital IO card, analog IO card and a resistance analog card) is built according to the number of output signal paths of the distributed hybrid power system; and a fault injection module (providing fault injection board card to simulate an ECU pin for open-circuit, power short-circuit and ground short-circuit fault) and a BOB module are equipped at the same time. A rapid prototyping controller is obtained according to the above method based on the control strategy of distributed hybrid power system. The real-time simulation board card in the rapid prototyping controller includes an analog input card (32-channel for analog input, 2 M/s sampling rate; 4-channel for analog output; 48-channel bidirectional digital IO; 2-channel 32-bit counter), an analog output card (32-channel for analog output, 10-channel digital quantity, and 4-channel 32-bit counter) and a power system simulation card (each module provides time sequence detection and fuel injection drive control of not less than two free piston engines; and each cycle supports at least 3 times of injection, the fuel injection pulse width is given by model calculation, and is dynamically adjusted). The real-time simulation board is embedded into the PXIe-1088 chassis and matched with the PXIe-8861 processor, and the corresponding control signal is output by the corresponding pin; and EDAC is used to connect the signal ports one by one to realize a connection between the rapid prototyping controller and the hardware-in-the-loop simulation system.

Communication addresses of the hardware-in-the-loop simulation system and the rapid prototyping controller are respectively input into connection software (NI Max) of a real-time simulator of an upper computer to ensure a stable connection between the semi-physical simulation test platform and the upper computer.

A communication interface is set for an output signal of the hardware-in-the-loop simulation system and a visualization platform based on software, and the upper computer performs a communication interface test to ensure that an output signal port of the hardware-in-the-loop simulation system corresponds to a signal port of the visualization platform one by one, and can stably receive a signal. The main function of the visualization platform is a test of the distributed hybrid power system and can realize data monitoring during the test and a three-dimensional scene display function. The system includes two major parts, namely, a two-dimensional configuration and a three-dimensional functional module, which includes a visual UI, a terrain selection, a day-night selection, a weather system configuration, a two-dimensional flow chart and graph, a three-dimensional model data module, a three-dimensional energy flow relationship and a three-dimensional visual functional module. Each part is connected under the same network and communicates via a unified network protocol to ensure the consistency of communication data. The terrain selection and the day-night selection are realized by means of button selection of visualization software, and the button is clicked to make a single selection in the day-night, weather and terrain. A Boolean variable is expressed as True when one of above is selected, and the selected item is stored in a List; and the Boolean variable is set as False when other items are set as unselected. The information about a selected vehicle and vehicle modules is stored in the List when the button clicks a tested vehicle, the maximum value and the minimum value of the modules are controlled using a sliding bar component, a value type is specified as an integer type, and the number of modules is set by dragging a sliding bar. The data display and data flow direction related to the data are mainly completed by a data storage module and a scene value module, the function of storing data is mainly used for storing configuration data, and the configured two-dimensional information is stored in an Excel data table. The configuration data includes selected day-night, weather (sunny, rainy and snowy), terrain (desert and city), and vehicle configuration information (the tested vehicle, the power module and attachment coefficient). The data format is stored in a Unity cache list as String during program running, the cache list can be refreshed, the cache list is refreshed after each change or reconfiguration, and the data is stored in the Excel data table if data in the cache list is determined to be not empty via a script method. The Excel data table is imported to an Excel. dll library, a method for reading an Excel table is created, the Excel data table is traversed, and the read data is stored in the Unity cache. Whether two-dimensional configuration information in the List has data is determined, and text prompts will appear below an interface if configuration information is not configured. Under a condition that the two-dimensional configuration information is complete, a "start simulation" button is clicked to start executing a thread that reads the data from a Unity refresh cache list, and load the three-dimensional scene asynchronously. Finally, the running characteristics of the dynamic system are demonstrated in the visualization platform and a three-dimensional scene animation.

Matlab/Simulink is applied to build the simulation model of the distributed hybrid power system based on the solution involved in the distributed hybrid power system. A thermodynamic module and a dynamics module which can reflect the control effect of the control strategy of the distributed hybrid power system are mainly built, and a signal output module is set corresponding to the signal interface of the hardware-in-the-loop simulation system to ensure the real simulation of signals. At the same time, in order to successfully download to the hardware-in-the-loop simulation system, the simulation step type is adjusted to a fixed step size, and the simulation step size is adjusted to 1e-4.

According to a logic of the control strategy of the distributed hybrid power system, a code is formed in Simulink and a MATLAB Function module is generated, and a signal output module is set for a control signal output by the control strategy of the distributed hybrid power system to accurately correspond to an output signal interface of the rapid prototyping controller, and the simulation step length and the type thereof are set to be consistent with the environment of a controlled object model.

Using a code conversion module of Simulink, a simulation model file of the distributed hybrid power system is converted into a dll file and downloaded to a real-time simulator of the hardware-in-the-loop simulation system, and a model file of the control strategy of the distributed hybrid power system is converted into a so file and downloaded to a real-time simulator of the rapid prototyping controller.

A download condition of a model and a signal feedback connection condition between the hardware-in-the-loop simulation platform and the upper computer are detected by upper computer software (Veristand).

The semi-physical simulation platform is run by the upper computer software (Veristand), a signal of the hardware-in-the-loop simulation system is transmitted to the rapid prototyping controller firstly, the successful signal reception of the rapid prototyping controller represents successful pairing, and a signal of the control strategy of the distributed hybrid system is input to the hardware-in-the-loop simulation system to achieve the control effect.

The feasibility and real-time performance of the control strategy of the distributed hybrid power system are verified by a dynamic characteristic data curve transmitted by the hardware-in-the-loop simulation system in the visualization platform, and the verification of the control strategy of distributed hybrid power system is realized.

The beneficial effects of the above technical solution are as follows. According to the method for verifying and testing a control strategy of a distributed hybrid power system provided by the present disclosure, the hardware-in-the-loop simulation system is employed to simulate a real working state and an output signal of the distributed hybrid power system, the rapid prototyping controller is employed to simulate a control signal of the control strategy of the distributed hybrid power system, and the hardware-in-the-loop simulation system and the rapid prototyping controller are connected to realize a control connection between a control end and a controlled object. The feasibility and real-time performance of the control strategy of the distributed hybrid power system are verified by dynamic characteristic signals of the distributed hybrid power system output by the hardware-in-the-loop simulation system. At the same time, to better show the output signal of the distributed hybrid power system, the software is employed to realize the visual transmission of the data, and the output signal of the distributed hybrid power system of the hardware-in-the-loop simulation system is transmitted to the visualization platform. A running characteristic curve of the distributed hybrid power system is visually displayed on the platform, thereby realizing the visual and effective state monitoring of the power system and enhancing the verification feasibility of the control strategy of the distributed hybrid power system.

Finally, it is noted that the above preferred examples illustrate rather than limit the present disclosure. Although the present disclosure has been described in detail through the above preferred examples, those skilled in the art will understand that various changes in form and details may be made to the present disclosure without departing from the scope of the present disclosure as defined by the appended claims.

The invention claimed is:

1. A semi-physical simulation verification method for a control strategy of a distributed hybrid power system, comprising the following steps:

designing and obtaining a rapid prototyping controller based on a distributed hybrid power system and a control strategy of the distributed hybrid power system in advance;

inputting communication addresses of a hardware-in-the-loop simulation system and the rapid prototyping controller into connection software of a real-time simulator of an upper computer respectively, and completing a connection work between a semi-physical simulation platform and the upper computer;

building a simulation model of the distributed hybrid power system based on an architecture of the distributed hybrid power system;

forming a code and generating a Function module based on the control strategy of the distributed hybrid power system, setting a signal output module for a control signal output by the control strategy of the distributed hybrid power system, and establishing a corresponding relationship between same and an output signal interface of the rapid prototyping controller;

using a code conversion module to convert a simulation model file of the distributed hybrid power system into a dll file and download same to a real-time simulator of the hardware-in-the-loop simulation system, and to convert a model file of the control strategy of the distributed hybrid power system into a so file and download same to a real-time simulator of the rapid prototyping controller;

detecting a download condition of a model and a signal feedback connection condition between the semi-physical simulation platform and the upper computer by upper computer software;

running the semi-physical simulation platform by the upper computer software, and verifying a feasibility and real-time performance of the control strategy of the distributed hybrid power system by a dynamic characteristic data curve transmitted by the hardware-in-the-loop simulation system in a visualization platform;

communicatively connecting the visualization platform to the hardware-in-the-loop simulation system, performing a communication interface test via the upper computer software to ensure that an output signal port of the hardware-in-the-loop simulation system corresponds to a signal port of the visualization platform one by one, and performing signal receiving work;

the visualization platform comprising two major parts, namely, a two-dimensional configuration module and a three-dimensional functional module; comprising: a visual user interface (UI), a terrain selection, a day-night selection, a weather system configuration, a two-dimensional flow chart and graph, a three-dimensional model data module, a three-dimensional energy flow relationship and a three-dimensional visual functional module; multiple parts being connected under one network, and communicating via a unified network protocol; the terrain selection and the day-night selection being realized by means of button selection of visualization software, and the button being clicked to make a single selection in day-night, weather and terrain; a Boolean variable being expressed as True when one of above is selected, and a selected item being stored in a List; and the Boolean variable being set as False when other items are set to unchecked;

storing information about a selected vehicle and vehicle modules in the List when the button clicks a tested vehicle, controlling a maximum value and a minimum value of the modules using a sliding bar component, specifying a value type as an integer type, and selecting a number of modules via a set sliding bar; completing a data display and data flow direction by a data storage module and a scene value module, and the data storage module being used for storing configuration data and storing configured two-dimensional information in a data table; and the configuration data comprising selected day-night, weather, terrain and vehicle configuration information;

storing a data format as String in a cache list during program running, refreshing the cache list after each change or reconfiguration, and saving the data in the Excel data table if the data in the cache list is determined to be not empty via a script method; and importing the data table into a dll library, creating a method for reading the data table, traversing the data table, and storing read data in the cache list; determining whether two-dimensional configuration information in the List has data via the script method, and performing text prompts below an interface if configuration information is not configured; and providing the button to start executing a thread that reads data from a refresh cache list under a condition that two-dimensional configuration information is complete, loading a three-dimensional scene asynchronously, and finally displaying running characteristics of the distributed hybrid power system in the visualization platform and a three-dimensional scene animation.

2. The semi-physical simulation verification method for a control strategy of a distributed hybrid power system according to claim 1, wherein the designing and obtaining a rapid prototyping controller based on a distributed hybrid power system and a control strategy of the distributed hybrid power system in advance comprises the following steps:

designing and obtaining a real-time simulator board card capable of outputting dynamic characteristic signals based on a signal output rule in a design solution of the distributed hybrid power system;

embedding the real-time simulation board card into a PXIe-1085 chassis and matching same with a PXIe-1088 processor, and outputting a corresponding signal via a corresponding pin, and building a signal conditioning module according to a number of output signal paths of the distributed hybrid power system;

obtaining a simulator after being equipped with a fault injection module and a break-out box (BOB) module, the fault injection module being used for simulating an electronic control unit (ECU) pin for open-circuit, power short-circuit and ground short-circuit fault; and constructing the rapid prototyping controller based on the control strategy of the distributed hybrid power system by the real-time simulator.

3. The semi-physical simulation verification method for a control strategy of a distributed hybrid power system according to claim 2, wherein the real-time simulator board card comprises:

an analog input card, with 32-channel for analog input, a 2M/s sampling rate, 4-channel for analog outputs, 48-channel bidirectional digital input/output (IO) and 2-channel 32-bit counter;

an analog output card, with 32-channel for analog output, 10-channel digital quantity and 4-channel 32-bit counter; and a power system simulation card, which supports time sequence signal simulation and fuel injection signal acquisition of a free piston engine, comprising at least 16 solenoid valve detections, and detection values comprising a solenoid valve opening piston position, a solenoid valve closing piston position and a start time.

* * * * *